Figure 1:
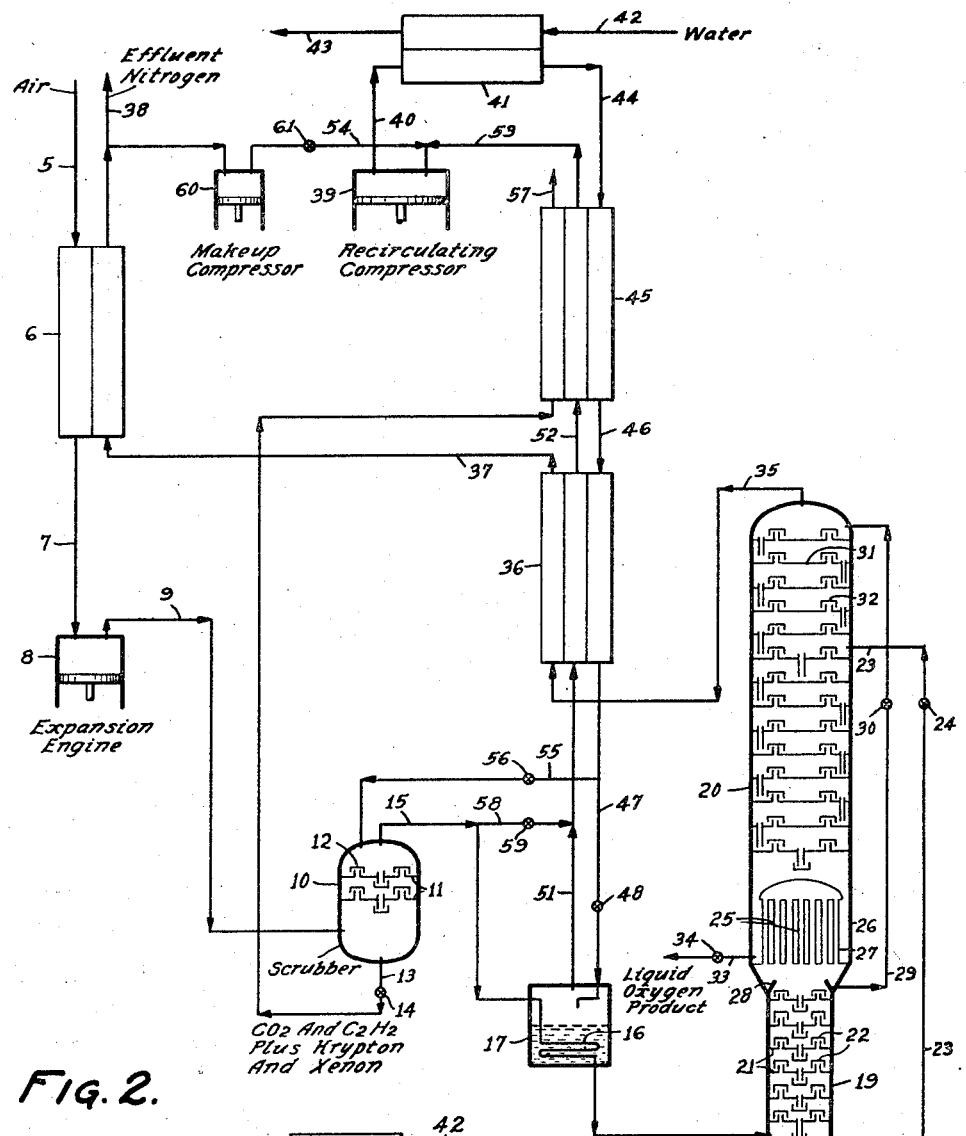

March 28, 1950     J. L. SCHLITT     2,502,282
SEPARATION OF THE CONSTITUENTS OF AIR Filed Jan. 7, 1948

INVENTOR
Joseph L. Schlitt
BY
ATTORNEYS

Patented Mar. 28, 1950

2,502,282

UNITED STATES PATENT OFFICE 2,502,282

SEPARATION OF THE CONSTITUENTS OF AIR

Joseph L. Schlitt, Darien, Conn., assignor to Air Reduction Company, Incorporated, New York, N. Y., a corporation of New York Application January 7, 1948, Serial No. 907

11 Claims. (Cl. 62—175.5)

This invention relates to the separation of the constituents of atmospheric air and more particularly to a method whereby carbon dioxide and hydrocarbons such as acetylene are removed from the air prior to rectification, without resort to chemical scrubbing.

Atmospheric air always contains a small proportion of carbon dioxide which, if carried through a liquefaction system, may solidify at some point where it interferes with the free flow of gases and liquids. Heretofore it has been the usual practice to employ chemical scrubbers for the removal of carbon dioxide. Such scrubbers are costly to build and to operate, and are otherwise objectionable. Frequently, also, small proportions of acetylene, and in the case of oil lubricated compressors, small amounts of oil enter the rectification system.

It is the object of the present invention to provide a method for separating the constituents of air by liquefaction and rectification in which the air is purified by initial scrubbing with a relatively small quantity of a liquefied gas to remove impurities therefrom.

Another object of the invention is to provide a method of removing carbon dioxide and other impurities from nonchemically treated air prior to rectification, without cooling the air by indirect heat transfer below the point at which carbon dioxide begins to solidify at the pressure employed in the system.

Another object is the provision of a method which can be operated to remove krypton and xenon as well as carbon dioxide and hydrocarbons from the air prior to rectification.

Other objects and advantages of the invention will be apparent as it is better understood by reference to the following specifications and the accompanying drawing which illustrates diagrammatically an apparatus suitable for the practice of the method.

In accordance with the present invention, the air entering the system, after initial compression, cooling, and partial expansion, is washed with a liquid substantially free of carbon dioxide and hydrocarbons. The washing liquid may come from the rectification system, for example, it may be liquid nitrogen produced therein. However, I prefer to use liquid that is produced in a separate cycle in which the gas is circulated with compression and cooling, and liquefaction by heat exchange with cold products of the operation. Washing with the liquid substantially removes the carbon dioxide and acetylene and hydrocarbons such as compressor lubricating oil which may be present. It may also be employed to remove the krypton and xenon present in the air entering the system. The gas circulating in the separate cooling system may be any suitable gas, for example, air or nitrogen substantially free of carbon dioxide and acetylene. Since the liquid used for washing is withdrawn from the separate cooling system, make-up gas in the form of nitrogen or air, for example, is introduced in the cooling cycle to compensate for the loss.

After washing, the air thus treated is subjected to rectification to separate oxygen from an effluent consisting chiefly of nitrogen. The nitrogen effluent is used for cooling in the system and is then discharged. The oxygen may then be withdrawn as a liquid or as a gas, as desired.

As a result of the operation, carbon dioxide, acetylene, and other hydrocarbons are removed from the system at a point where there is no adverse effect on the system. The liquid carrying the carbon dioxide, acetylene, and krypton and xenon is withdrawn so that these elements and compounds are not carried over into the rectification system to contaminate the products thereof or to accumulate in the rectifier.

Figure 2:
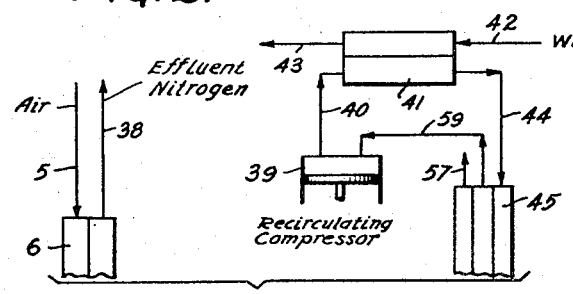

The invention will be further described in connection with the accompanying drawings, in which Fig. 1 is a diagrammatic view of one form of an apparatus in which the method of the invention may be carried out, and Fig. 2 is a diagrammatic view of a portion of another form of apparatus which may be used.

Referring to the drawing, and first to Fig. 1, air, after initial compression, and cooling in the usual intercoolers (not shown) is introduced through a pipe 5 to an exchanger 6 where it is further cooled by heat exchange with cold nitrogen forming the effluent from the rectification. The cold, compressed air escapes through a pipe 7 to an expansion engine 8 where it is expanded with external work to a substantially lower pressure. The initial pressure of the air is that required to produce the necessary refrigerative effect in the system. For liquid oxygen production a preferred range is from 60 to 90 atmospheres. After expansion in the engine 8 to a pressure of about 5 atmospheres, for example, the air is delivered through a pipe 9 to a scrubber 10 having a plurality of trays 11 and bubble caps 12. In the scrubber the air is subjected to the washing action of a liquid provided as hereinafter described.

The impurities such as carbon dioxide, and acetylene together with krypton and xenon, are taken up by the liquid flowing downwardly over trays 11. After reaching the base of scrubber 10 this liquid is delivered through pipe 13 controlled by valve 14 to a compartment of exchanger 45 wherein its cold is recovered by exchange with recirculated gas. Leaving exchanger 45, this vaporized liquid is discharged through pipe 57 to atmosphere or if desired to storage, after which the krypton and xenon may be recovered therefrom in a separate operation.

The washed air is withdrawn through a pipe 15 and is partially liquefied by passage through a coil 16 submerged in a boiling liquid in condenser 17. Thereafter the air is delivered through a pipe 18 to the bottom of a rectification column.

A column adapted for single rectification may be employed, but I prefer double rectification in a column having a high pressure section 19 and a low pressure section 20. The air entering the high pressure section 19 passes upwardly through trays 21 provided with bubble caps 22 in contact with liquid descending through the trays. The air is thus enriched in oxygen, and the enriched liquid is delivered through a pipe 23 and pressure reducing valve 24 to an intermediate point in the low pressure section 20 of the column.

After passing the trays 21, the unliquefied air, which is enriched in nitrogen, passes upwardly through a plurality of tubes 25 in a condenser 26 and then downwardly through tubes 27 of the condenser.

In the condenser, a portion of the air enriched in nitrogen is condensed to provide the liquid that flows downwardly over the trays 21. The unliquefied residue is liquefied in the tubes 27 and flows into a collector 28, from which it is withdrawn through a pipe 29 and pressure reducing valve 30 and delivered to the top of the low pressure section 20 of the column to provide the reflux liquid necessary for rectification. The two liquids supplied to the low pressure section pass downwardly over trays 31 having bubble caps 32, through the low pressure section of the column, with the gradual enrichment of the liquid in oxygen, so that substantially pure oxygen liquid accumulates around the tubes 25 and 27 in condenser 26. A portion of the liquid oxygen may be withdrawn as a product through a pipe 33 controlled by a valve 34.

The effluent, consisting principally of nitrogen, escapes through a pipe 35 at the top of the low pressure section 20, and is delivered to an exchanger 36, thence through a pipe 37 to the exchanger 6. It is finally discharged through a pipe 38 to the atmosphere or to any suitable receptacle for collection and storage.

In order to maintain the supply of washing liquid to scrubber 10 and the boiling liquid in condenser 17, a suitable gas such as nitrogen or air or air enriched in nitrogen is circulated through a compressor 39 where it is compressed to a suitable pressure, for example, from 40 to 70 atmospheres. The recirculated gas is delivered through a pipe 40 to an exchanger where it is initially cooled by water supplied through a pipe 42 and discharged through a pipe 43. The partially cooled gas from exchanger 41 passes through a pipe 44 to an exchanger 45 where it is cooled by heat exchange with vapor returning to the compressor and by the liquid from the base of scrubber 10. The gas is then delivered through a pipe 46 to the exchanger 36 where it is further cooled by heat exchange with the returning vapor and with the effluent nitrogen delivered to the exchanger 36 through the pipe 35. The gas is thus liquefied and the major portion of it escapes through a pipe 47 and expansion valve 48 into the condenser 17 where it is vaporized by heat exchange with the air passing through the coil 16. In case air or nitrogen is used as the recirculated gas the pressure in condenser 17 may be maintained advantageously at considerably higher than atmospheric, for example, say 3 to 5 atmospheres. The remainder of the liquid leaving exchanger 36 is delivered through pipe 55 and valve 56 to the scrubber 10 where it performs the function of removing carbon dioxide, acetylene and krypton and xenon from the entering air.

The vapor from the condenser 17 is delivered through a pipe 51 to the exchanger 36, thence through a pipe 52 to the exchanger 45 and finally through the pipe 53 to the compressor 39. The apparatus illustrated in Fig. 1 is sufficiently flexible to enable the use of air alone, nitrogen alone, or nitrogen-enriched air as the recirculated medium. If air alone is to be recirculated, valve 59 is opened and valve 61 is closed. The make-up gas necessary to compensate for the liquid delivered to the scrubber 10 then will be taken from pipe 15 and delivered through pipe 58 and control valve 59, into pipe 51. In case it is desired that nitrogen enriched air be used as the recirculated gas, valves 59 and 61, respectively, are opened to the desired extent to give the desired proportion of nitrogen to air and the necessary nitrogen for use in the make-up then will be supplied by means of compressor 60 taking effluent nitrogen from pipe 38 and delivering it to the suction of recirculating compressor 39 by means of valve 61 and pipe 54. If nitrogen alone is to be used as the recirculated medium the valve 59 is closed and the valve 61 is opened sufficiently to permit an ample supply of nitrogen from the effluent nitrogen pipe 38 to the compressor 60 which delivers it to the suction of recirculating compressor 39.

Where it is not desired that nitrogen shall be recirculated for use as a part or all of the gas to be liquefied for use as make-up washing liquid, the make-up compressor 60 and the connection from the effluent nitrogen pipe 38 to the make-up compressor and the connection from the make-up compressor to the recirculating compressor may, if desired, not be included as a part of the apparatus. An apparatus in which the make-up compressor and the connections to and from it are omitted is disclosed in Fig. 2. In other respects the apparatus of Fig. 2 will be identical with the apparatus of Fig. 1.

The process has been described for the production of liquid oxygen but it is apparent that it may be applied to the production of gaseous oxygen as well by the proper regulation of pressures and other variables.

Various processes have been proposed in which readily solidified impurities are removed by liquid air scrubbing. In general, if these proposed processes are supplied with air containing the normal concentration of carbon dioxide, fouling of some of the heat transfer surfaces by solid carbon dioxide results. In this process, air containing acetylene and normal concentrations of carbon dioxide is not subject to indirect heat transfer at temperatures sufficiently cold to solidify these impurities. The necessary indirect transfer of heat at low temperatures is accomplished by means of recirculated gas in which such impurities are absent. Furthermore, if oil lubricated compressors are used, no substantial amount of oil enters the oxygen separation column as any oil reaching scrubber 10 is substantially removed by the scrubbing liquid.

Krypton and xenon are highly concentrated in the liquid leaving the base of scrubber 10 and may be readily separated as a rare gas product.

The procedure affords a simple and satisfactory operation which assures delivery, to the rectification column, of air which is free from carbon dioxide, acetylene, and other hydrocarbons and which may be utilized also to recover krypton and xenon from the air. The operation is economical and otherwise entirely practical.

Various changes may be made in the details of procedure as described without departing from the invention or sacrificing the advantages thereof.

I claim:

1. The method of separating the constituents of air which comprises washing the air from which constituents are to be separated with a washing liquid substantially free from impurities, subjecting at least a part of the washed air to liquefaction and rectification with resultant separation of oxygen from a gaseous effluent consisting principally of nitrogen, separately liquefying a portion of the air which was washed to provide the washing liquid substantially free from impurities, and introducing said washing liquid to the washing zone for washing further amounts of air from which constituents are to be separated.

2. The method of separating the constituents of air which comprise expanding compressed and cooled air from which constituents are to be separated, washing the expanded air with a washing liquid substantially free from impurities, subjecting at least a part of the expanded and washed air to liquefaction and rectification with resultant separation of oxygen from a gaseous effluent consisting principally of nitrogen, separately compressing, cooling and liquefying a portion of the expanded air which was washed to provide the washing liquid substantially free from impurities, and introducing said washing liquid to the washing zone for washing further amounts of expanded air from which constituents are to be separated.

3. The method of separating the constituents of air which comprises washing the air from which constituents are to be separated with a washing liquid substantially free from impurities, subjecting at least a part of the washed air to liquefaction and rectification with resultant separation of oxygen from a gaseous effluent consisting principally of nitrogen, separately liquefying a product of the liquefaction and rectification of the washed air to provide at least a part of the washing liquid substantially free from impurities, and introducing said washing liquid to the washing zone for washing further amounts of air from which constituents are to be separated.

4. The method of separating the constituents of air which comprises washing the air from which constituents are to be separated with a washing liquid substantially free from impurities, subjecting a part of the washed air to liquefaction and rectification with resultant separation of oxygen from a gaseous effluent consisting principally of nitrogen, separately liquefying another portion of the washed air to provide the washing liquid substantially free from impurities, and introducing said washing liquid to the washing zone for washing further amounts of air from which constituents are to be separated.

5. The method of separating the constituents of air which comprises washing the air from which constituents are to be separated with a washing liquid substantially free from impurities, subjecting at least a part of the washed air to liquefaction and rectification with resultant separation of oxygen from a gaseous effluent consisting principally of nitrogen, separately liquefying a portion of the gaseous effluent to provide at least a part of the washing liquid substantially free from impurities, and introducing said washing liquid to the washing zone for washing further amounts of air from which constituents are to be separated.

6. The method of separating the constituents of air which comprises washing the air from which constituents are to be separated from a washing liquid substantially free from impurities, subjecting at least a part of the washed air to liquefaction and rectification with resultant separation of oxygen from a gaseous effluent consisting principally of nitrogen, separately liquefying a portion of the air which was washed to provide a liquid substantially free from impurities, vaporizing a portion of said latter liquid by indirect heat exchange with the air to be subjected to the liquefaction and rectification, and introducing the remainder of said latter liquid to the washing zone for washing further amounts of air from which constituents are to be separated.

7. The method of separating the constituents of air which comprises washing the air from which constituents are to be separated with a washing liquid substantially free from the impurities, subjecting at least a part of the washed air to liquefaction and rectification with resultant separation of oxygen from a gaseous effluent consisting principally of nitrogen, separately liquefying a portion of the air which was washed to provide a liquid substantially free from impurities, vaporizing a portion of said latter liquid by indirect heat exchange with the air to be subjected to the liquefaction and rectification, introducing the remainder of said latter liquid to the washing zone for washing further amounts of air from which constituents are to be separated, and returning the vaporized portion of said latter liquid for re-liquefaction.

8. The method of separating the constituents of air which comprises washing the air from which constituents are to be separated with a washing liquid substantially free from impurities, subjecting at least a part of the washed air to liquefaction and rectification with resultant separation of oxygen from a gaseous effluent consisting principally of nitrogen, separately liquefying a portion of the air which was washed to provide a liquid substantially free from impurities, vaporizing a portion of said latter liquid by indirect heat exchange with the air to be subjected to the liquefaction and rectification, introducing the remainder of said latter liquid to the washing zone for washing further amounts of air from which constituents are to be separated, returning the vaporized portion of said latter liquid for re-liquefaction, and introducing makeup-gas with the vaporized portion of said latter liquid in amount substantially corresponding to the amount of washing liquid introduced to the washing zone.

9. The method of separating the constituents of air which comprises cooling compressed air from which constituents are to be separated by indirect heat exchange, maintaining the temperature of the air during said cooling by indirect heat exchange above that at which carbon dioxide will begin to solidify, washing the cooled air with a washing liquid substantially free from impurities, subjecting at least a part of the washed air to liquefaction and rectification with resultant separation of oxygen from a gaseous effluent consisting principally of nitrogen, separately liquefying a portion of the air which was washed to provide the washing liquid substantially free from impurities, and introducing said washing liquid to the washing zone for washing further amounts of air from which constituents are to be separated.

10. The method of separating the constituents of air which comprises washing the air from which constituents are to be separated with a washing liquid substantially free from impurities, subjecting at least a part of the washed air to liquefaction and rectification with resultant separation of oxygen from a gaseous effluent consisting principally of nitrogen, separately liquefying a portion of the air which was washed by indirect heat exchange with cold products of the air separation to provide the washing liquid substantially free from impurities, and introducing said washing liquid to the washing zone for washing further amounts of air from which constituents are to be separated.

11. The method of separating the constituents of air which comprises washing the air from which constituents are to be separated with a washing liquid substantially free from impurities, subjecting at least a part of the washed air to liquefaction and rectification with resultant separation of oxygen from a gaseous effluent consisting principally of nitrogen, separately liquefying a portion of the air which was washed to provide a portion of the washing liquid substantially free from impurities, separately liquefying a product of the liquefaction and rectification of the washed air to provide another portion of the washing liquid, and introducing said portions of the washing liquid to the washing zone for washing further amounts of air from which constituents are to be separated.

JOSEPH L. SCHLITT.

REFERENCES CITED

The following references are of record in the file of this patent:

UNITED STATES PATENTS

| Number | Name | Date |
| --- | --- | --- |
| 1,395,466 | Barbet | Nov. 1, 1921 |
| 1,864,585 | DeBaufre | June 28, 1932 |
| 2,411,680 | Dennis | Nov. 26, 1946 |
| 2,413,752 | Dennis | Jan. 7, 1947 |
| 2,423,273 | Van Nuys | July 1, 1947 |
| 2,433,508 | Dennis | Dec. 30, 1947 |